United States Patent
Lee et al.

(10) Patent No.: US 10,909,105 B2
(45) Date of Patent: Feb. 2, 2021

(54) LOGICAL LOGGING FOR IN-MEMORY METADATA STORE

(71) Applicant: SAP SE, Walldorf (DE)

(72) Inventors: Joo Yeon Lee, Seoul (KR); Eunsang Kim, Seoul (KR); Myung Sun Park, Seoul (KR); Sunghoon Lee, Seoul (KR); Hanggjun Cho, Seoul (KR)

(73) Assignee: SAP SE, Walldorf (DE)

( * ) Notice: Subject to any disclaimer, the term of this patent is extended or adjusted under 35 U.S.C. 154(b) by 1001 days.

(21) Appl. No.: 15/362,712

(22) Filed: Nov. 28, 2016

(65) Prior Publication Data

US 2018/0150499 A1     May 31, 2018

(51) Int. Cl.
| | |
|---|---|
| *G06F 16/23* | (2019.01) |
| *G06F 11/20* | (2006.01) |
| *G06F 11/14* | (2006.01) |

(52) U.S. Cl.
CPC ...... *G06F 16/2358* (2019.01); *G06F 11/1471* (2013.01); *G06F 11/2038* (2013.01); *G06F 11/2048* (2013.01); *G06F 11/2097* (2013.01); *G06F 2201/80* (2013.01)

(58) Field of Classification Search
CPC ............ G06F 11/1471; G06F 11/2038; G06F 11/2048; G06F 11/2097; G06F 16/2358; G06F 2201/80
See application file for complete search history.

(56) References Cited

U.S. PATENT DOCUMENTS

| | | | |
|---|---|---|---|
| 10,360,251 B1* | 7/2019 | Bairavasundaram | G06F 16/355 |
| 10,623,485 B2* | 4/2020 | Braam | G06F 11/1471 |
| 2003/0028514 A1* | 2/2003 | Lord | G06F 11/2064 |
| 2003/0078946 A1* | 4/2003 | Costello | G06F 11/2064 |
| 2006/0123024 A1* | 6/2006 | Sathyanarayan | H04L 61/1523 |
| 2006/0136360 A1* | 6/2006 | Gebhart | G06F 11/3476 |
| 2006/0218204 A1* | 9/2006 | Ofer | G06F 11/202 |
| 2007/0100906 A1* | 5/2007 | Cheng | G06F 16/27 |
| 2008/0077590 A1* | 3/2008 | Pandit | G06F 11/1435 |
| 2008/0089487 A1* | 4/2008 | Chen | H04M 1/274516 379/88.12 |
| 2009/0217250 A1* | 8/2009 | Grechanik | G06F 8/36 717/136 |

(Continued)

*Primary Examiner* — Mark D Featherstone
*Assistant Examiner* — Navneet Gmahl
(74) *Attorney, Agent, or Firm* — Jones Day

(57) ABSTRACT

Systems and methods for generating a metadata log in a database recovery system include generating, at its primary system, a metadata log for a logging period. A change applied to a metadata object accessible from the primary system is detected, and upon detection, the system identifies a pair of a unique metadata identifier and a metadata type for the changed metadata object and determines a metadata structure of the changed metadata object. A data exchange object for the metadata structure is generated and a data exchange element from the data exchange object is created. The metadata log is updated with log information that includes the data exchange element and the pair, which is associated with the data exchange element. Upon the logging period ending, the metadata log is transmitted to a secondary system of the database recovery system for replaying. Related apparatus, systems, techniques and articles are also described.

20 Claims, 13 Drawing Sheets

(56) References Cited

U.S. PATENT DOCUMENTS

| | | | |
|---|---|---|---|
| 2012/0221576 A1* | 8/2012 | Marquardt | G06F 16/1734 707/741 |
| 2014/0244897 A1* | 8/2014 | Goss | G06F 12/0238 711/103 |
| 2015/0052392 A1* | 2/2015 | Mickens | G06F 11/2069 714/15 |
| 2017/0060702 A1* | 3/2017 | Dave | G06F 16/184 |
| 2017/0177452 A1* | 6/2017 | Parab | G06F 11/1471 |

* cited by examiner

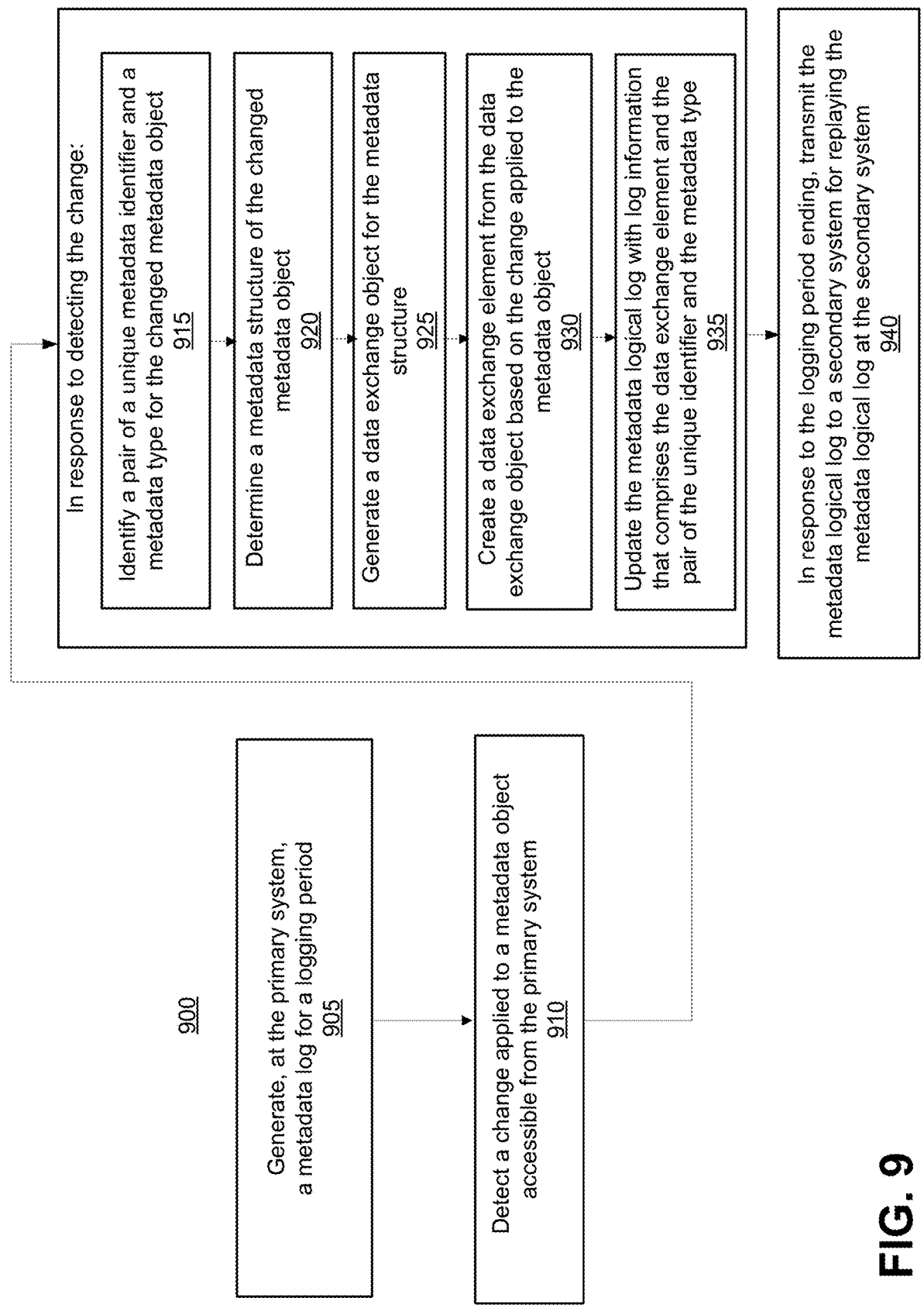

1000

Receive, at a secondary sytem, a metadata log including log information that comprises at least one data exchange element and at least one pair of a unique metadata object identifier and a metadata object type
1010

For each log information:

Search the metadata indexes for an index that corresponds to the at least one pair in the received metadata log
1020

Responsive to determining an index that corresponds to the at least one pair:

Identify a metadata object associated with the index
1025

Apply changes to a concurrent metadata structure of the identified metadata object, the applied changes being based on the at least one data exchange element associated with the corresponding at least one pair
1030

FIG. 10

LOGICAL LOGGING FOR IN-MEMORY METADATA STORE

TECHNICAL FIELD

The subject matter described herein relates in general to field of computer database systems. More specifically, the disclosed subject matter relates to metadata catalogs and logical logging of metadata that allows for platform-independent representation and use of metadata in the context of database systems and database recovery systems.

BACKGROUND

Database systems typically function as database servers to store and retrieve data as requested by client applications. Commercial database systems, such as the SAP HANA® database, are required to handle increasingly more complex and diverse data, including database objects, used by larger numbers of client applications. In addition, many database systems function as in-memory computing platforms that perform complex analytics on the data stored or exchanged with its client applications.

In database systems, metadata is generally used to describe various forms of data that are handled by the database systems. Metadata typically refers to data that provides information about other data. In the case of database systems, metadata includes information about database objects used by its client applications or its internal calculation engine that performs complex analytics on the database objects. Metadata can be broadly characterized as structural metadata, descriptive metadata, and administrative metadata.

There is a need for systems and methods that simplify implementing solutions for database systems and their client applications that deal with large numbers and types of metadata and database objects. In addition, there is a need for systems and methods that allows for efficiently communicating metadata or data between multiple database systems in a platform-independent manner.

SUMMARY

In one aspect, disclosed herein are systems and methods for generating a platform-independent metadata catalog framework of a database system. Related apparatus, systems, techniques, non-transitory computer-readable storage media and articles are also described. These include receiving, at the database system, a metadata object, and determining a version of the received metadata object. Responsive to determining that a metadata catalog, which has catalog entries associated with unique versions of metadata objects, does not include a catalog entry associated with the version of the received metadata object, a catalog entry in the metadata catalog is created. The created catalog entry is then associated with the version of the received metadata object. Furthermore, a version number based on the version of the received metadata is generated, which is associated with the created catalog entry.

In some embodiments, the version number associated with the created catalog entry is outputted. Responsive to determining that the metadata catalog includes a catalog entry associated with the version of the received metadata object, other embodiments further include outputting the catalog entry associated with the version of the received metadata object.

In some embodiments, responsive to determining that the metadata catalog includes one or more catalog entries associated with previous versions of the received metadata object, the version number associated with the created catalog entry is changed to a value that is indicative of a version that is later than the one or more catalog entries associated with the previous version of the received metadata object.

Some embodiments further include identifying a set of fields included in the received metadata object. In these embodiments, each field includes a definition of data included in the database system and the creating a catalog entry in the metadata catalog is based on the identified set of fields included in received metadata object.

In some embodiments, the determining that the metadata catalog includes one or more catalog entries associated with previous versions of the received metadata object includes comparing the definition of data of each field of the received metadata object with the definition of data of each field of the unique metadata object associated with each catalog entry included in the metadata catalog.

In some embodiments, each catalog entry comprises a version number that is indicative of the unique version of the metadata object. In yet other embodiments, the assigned value to the version number of the created catalog entry is larger than the version numbers of the one or more catalog entries associated with the previous version of the received metadata object.

In some embodiments, a field in the received metadata object includes a type and size. In other embodiments, the size of the received metadata object is based on the sizes of each field in the identified set. In yet other embodiments, the position of a field in the received metadata object is based on the sizes of each prior field in the identified set.

Some embodiments further include outputting one of the catalog entries in the metadata catalog in a platform-independent format, and outputting the version number of the outputted catalog entry. In some embodiments, the platform-independent format includes JSON, XML, YAML, REBOL, Gellish, Atom, HOCON, CVS, or any combination thereof.

In another aspect, disclosed herein are systems and methods for generating a metadata log in a database recovery system includes generating, at a primary system of the database recovery system, a metadata log for a logging period. Related apparatus, techniques, non-transitory computer-readable storage media and articles are also described. The system detects a change applied to a metadata object accessible from the primary system. In response to detecting the change applied to the metadata object accessible from the primary system, the system identifies a pair of a unique metadata identifier and a metadata type for the changed metadata object and determines a metadata structure of the changed metadata object. The system, further in response to detecting the change, generates a data exchange object for the metadata structure and creates a data exchange element from the data exchange object based on the change applied to the metadata object. The system then updates the metadata log with log information that comprises the data exchange element and the pair of the unique identifier and the metadata type. The pair is associated with the data exchange element. In response to the logging period ending, the system transmits the metadata log to a secondary system of the database recovery system for replaying the metadata log at the secondary system.

In some embodiments, the metadata log includes a logical log. In some embodiments, the data exchange object includes a JSON (JavaScript Object Notation) object and the data exchange element includes a JSON string. In some embodiments, the metadata structure is concurrent with a snapshot of the primary system and the snapshot comprises a metadata catalog of metadata objects included in the primary systems. In these embodiments, the metadata catalog is stored in memory of the primary system.

In some embodiments, the changed metadata object is a collection of one or more definitions of relational tables, columns, rows, views, indexes, fields, procedures, pointers, vectors, arrays, schemas, graphs, dictionaries, hierarchies, types, partitions, databases, dimensions, measures, models, or a combination thereof.

In some embodiments, the data exchange element comprises a pair of a key and a value, the value being associated with the key and representing the change applied to the metadata object.

In some embodiments, the log information in the metadata log represents changes to a plurality of metadata objects included in the metadata catalog, and the relationship of at least two metadata objects of the plurality of metadata objects is capable of being represented by a graph structure. In some embodiments, the log information further comprises a command that is associated with the data exchange element and represents the change applied to the metadata object. In some embodiments, the command is a data definition statement, data manipulation statement, data control statement or a combination thereof. In other embodiments, the command is a data definition statement that has a syntax of a data definition language.

In some embodiments, the method and system includes identifying a version of the changed metadata object, wherein the version is associated with the data exchange element and included in the log information. In some embodiments, the data exchange object is generated by mapping the metadata structure to the data exchange object based on the version of the changed metadata object.

In yet another aspect, disclosed herein are systems and methods for replaying a metadata log in a database recovery system includes receiving, at a secondary system of the database recovery system, a metadata log including log information that comprises at least one data exchange element and at least one pair of a unique metadata object identifier and a metadata object type. Related apparatus, techniques, non-transitory computer-readable storage media and articles are also described.

Each of the at least data exchange element are associated with one of the at least one pair. For each log information, the system searches metadata indexes for an index that corresponds to the at least one pair in the received metadata log. Responsive to determining an index that corresponds to the at least one pair, the system identifies a metadata object associated with the index and applies a change to a metadata structure of the identified metadata object. The applied change is based on the at least one data exchange element associated with the corresponding at least one pair.

In some embodiments, the metadata log includes a logical log. In some embodiments, the at least one data exchange element includes a JSON string.

In some embodiments, the method and system includes generating the metadata indexes. Each metadata index is associated with a metadata object that is accessible at the secondary system. In some embodiments, the metadata index is based on a pair of a unique metadata object identifier and metadata type for the associated metadata object.

In some embodiments, the metadata structure is concurrent with a snapshot of the secondary system, the snapshot comprising a metadata catalog of metadata objects included in the secondary systems. In some embodiments, the metadata catalog is stored in memory of the secondary system.

In some embodiments, the identified metadata object is a collection consisting of one or more definitions of relational tables, columns, rows, views, indexes, fields, procedures, pointers, vectors, arrays, schemas, graphs, dictionaries, hierarchies, types, partitions, databases, dimensions, measures, models, or a combination thereof. In some embodiments, the at least one data exchange element comprises a pair of a key and a value, the value being associated with the key and representing the change applied to the metadata structure.

In some embodiments, the log information further comprises commands, each command being associated with one of the at least one data exchange element and representing the change applied to the metadata object. In some embodiments, each command is a data definition statement, data manipulation statement, data control statement or a combination thereof. In some embodiments each command is a data definition statement that has a syntax of a data definition language.

In some embodiments, searching the metadata indexes for an index is based on a version of a metadata object that is included in the log information and associated with the at least one pair.

The subject matter described herein provides many technical advantages. Advantages of using a metadata logical log based on data exchange elements with database replication systems includes that the log is human-readable and can easily be parsed and searched by machines. In addition, a single metadata logical log including data exchange elements from different data exchange objects can represent changes of multiple structural metadata objects for database objects with graph structures.

In some embodiments, the data exchange object is a JSON object and the data exchange element is a JSON string that is a member of the JSON object. JSON is a lightweight data-interchange format that is platform-/system-independent that is based on a subset of the JavaScript Programming Language.

For example, each JSON string in the metadata log can represent a change to a database object of a relational table, including a change of the field or index of the table. Multiple JSON strings can then represent multiple changes to the relational table of the same or other database objects. This increases the performance of replicating and replaying changes to metadata objects at a secondary system of a database replication system, when compared to individual writes of a physical log for each slot update.

Furthermore, because JSON objects are coded in JavaScript, the metadata logs based on JSON objects are independent of the platform, system and language, eliminating the a dependency between log format and specification of persistent storage. Eliminating the dependency, increases transferability and portability of metadata changes between systems by using system-specific JSON-to-object mapping. This allows for replicating metadata changes to a secondary system of a database replication system without the need of additional manipulations (e.g., system-specific transformations) to the logs before transmitting or replaying the logs at the secondary system.

Advantages of a metadata catalog framework include that metadata catalogs simplify implementing solutions by developers for database systems or database replication systems. Metadata accessible through a metadata catalog allows platform-independent solutions and eliminates keeping track of versions of the database, on which the metadata is used. This allows for easily detecting modifications of metadata on different database versions and eliminates the need for migrating the metadata from one version to another version of a database to be able to identify any changes. The framework further allows representing metadata in formats (e.g., in JSON, XML (EXtensible Markup Language), YAML, REBOL, Gellish, Atom, HOCON and the like) that are independent of any platform or system, whether in-memory or outside memory.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 9 illustrates a flowchart of a method for generating a metadata logical log in a database replication system, according to some embodiments.

FIG. 10 illustrates flowchart of a method for replaying a metadata logical log in a database recovery system, according to some embodiments.

Like reference symbols in the various drawings indicate like elements.

DETAILED DESCRIPTION

Figure 1:
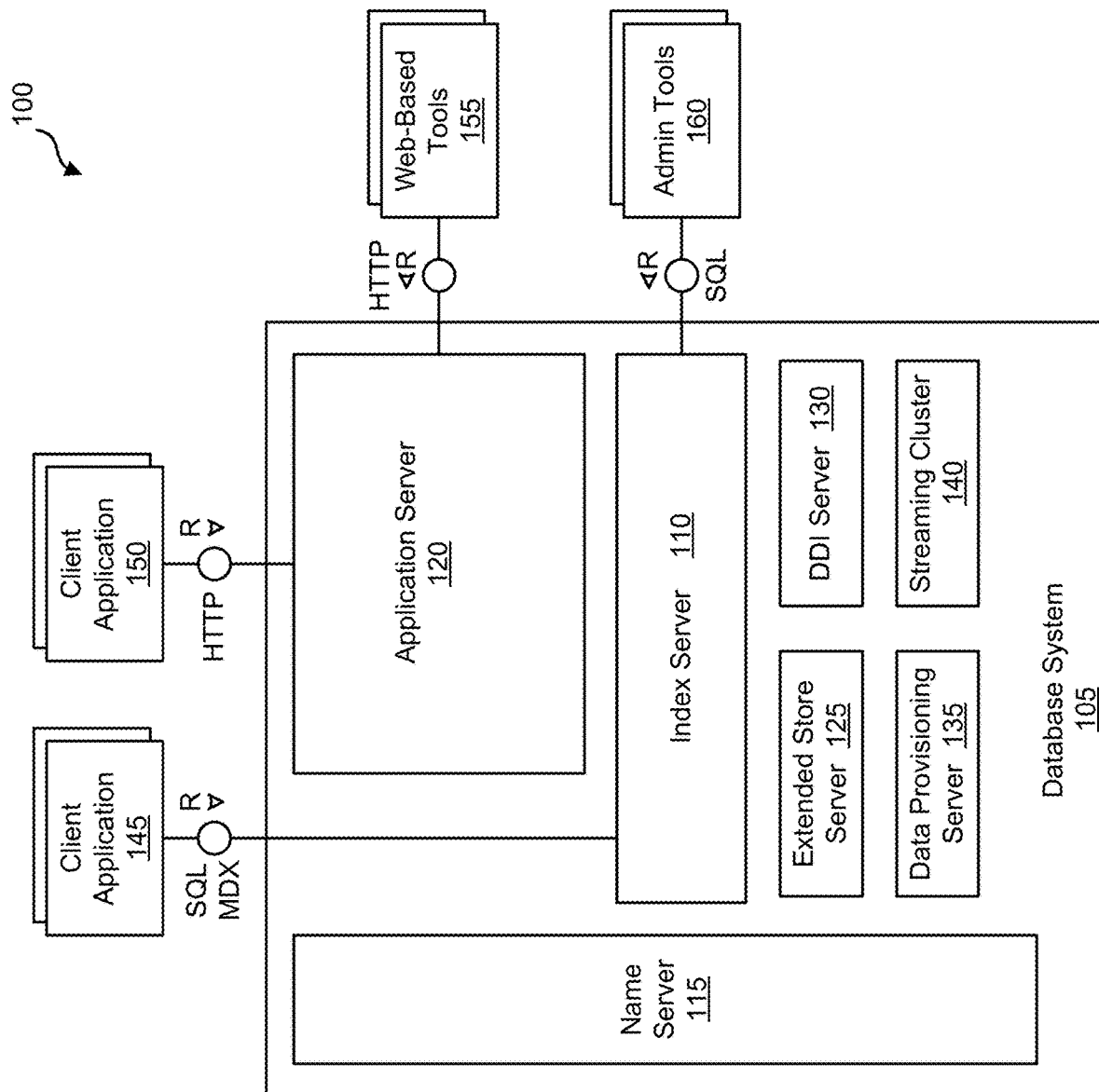
FIG. 1 is a system diagram illustrating an example database system for use in connection with a metadata catalog, according to some embodiments.

As noted above, metadata can be broadly characterized as structural metadata, descriptive metadata, and administrative metadata. Structural metadata refers to information that describes the structure of database objects included in database systems, while descriptive metadata includes information about database object that is used in searching a database system to identify, for example, the location of the underlying database object. On the other hand, administrative metadata includes information about database object that facilitates administrative tasks of handling the underlying database object. For example, a database system can use administrative metadata to organize database objects and identify relationship among the database objects managed by the database system.

Often, the responsibility of managing the metadata and the database objects described by the metadata is placed on the developers of the database system and its client applications. As the number of metadata and the corresponding number of database objects grows, developers are increasingly burdened by the overhead of implementing solutions that can handle this increase and the complexity that accompanies it without sacrificing the usability of their implementations.

For many of their client applications, database systems may be required to support operations on a 24/7 schedule, and database systems may be required to provide a guaranteed maximum amount of downtime, during which a database system is not able to fully support ongoing operations. When a system is required to ensure an agreed level of operational performance, it may be referred to as a high availability system ("HA").

Hot-standby systems are typically used to guarantee substantially continuous uptime with no, or very little, downtime. A hot-standby system, or a backup system, is a database system that may be activated quickly in the event of a disruption causing one or more functions of a primary operational database system to fail. Such a disruption may be referred to as a disaster, and the process of restoring a database system to full operations may be referred to as disaster-recovery ("DR").

Similarly, database systems may be required to provide prompt responses to users and applications that rely on the data managed by the database system. Providers and developers of data systems may be required to guarantee a minimum average throughput over time, or an average maximum response time. The speed with which a database system responds to a request from a user or an application may be dependent on many factors, but all systems are limited in the number of requests they can handle in a given period of time. When a database system manages a relatively large amount of data, and supports a relatively large number of users or applications, during high workloads a query or request may be queued, buffered or rejected until sufficient system resources are available to complete the query or request. In this case, average throughput decreases, while average response time increases. One solution to such a problem is to distribute the workload across multiple processing systems, which is known as load balancing.

One drawback to load balancing and HA systems is that they may require additional processing systems, which in turn increase the operating costs. Oftentimes, with database systems supporting critical functions of an organization these additional systems are needed to perform both load balancing and HA functionality to efficiently support continuous operations.

Load balancing and HA systems further contribute to the increase in metadata and the corresponding number of database objects, since data needs to be efficiently communicated between the various systems. Logging is typically used to communicate metadata or data between a primary database system and the various additional systems or for restoring a database system recovering from a disaster. Logging refers to creating and maintaining a log that lists any changes to the state of a database system. For example, logging can be used to prevent loss of persistent data in a database system.

Systems and methods are herein disclosed that use metadata logs and a catalog framework of metadata to communicate data changes and updates between database systems. In some embodiments, the metadata logs are logical logs. In some embodiments, the logical metadata logs include data exchange elements from data exchange objects. In some embodiments, the data exchange elements are JSON strings from JSON objects representing metadata objects in a platform-independent and human-readable format. A JSON string includes a string member of a JSON object that represents a key/value pair of the JSON object. On the other hand, a catalog framework allows for managing and representing various versions of metadata objects across different database systems in a platform-independent manner.

In some embodiments, logical metadata logs alone or in combination with a metadata catalog framework are used as part of a database replication system. A database replication system replicates a primary database system, or primary system, into at least one secondary database system, or secondary system. For example, a combination high availability/disaster recovery (HA/DR) system with load balancing includes both a primary operational system and a hot-standby (secondary) system. A secondary system may be an exact replica of the primary operational system that is capable of providing all the functions provided by the primary operational system. In some embodiments, all functional systems of the secondary are active and operational, and all system and data changes or updates occur in the primary operational system and the secondary at the exact same time.

In some embodiments, to communicate efficiently communicate the data changes and updates among the database systems in a platform-independent manner, the database replication system generates logical metadata logs in JSON at the primary system and replays the logical metadata logs at the secondary system. JSON is built on two structural elements, a collection of key/value pairs and an ordered list of values. This allows JSON to be used for representing metadata objects, especially structural metadata objects that represent graphical relationships between the parent data and its child objects. In this case, the collection of key/value pairs in JSON can represent member values of the metadata object and the ordered list can represent child objects or array type members of the metadata object.

By generating the logical metadata logs in JSON, JSON objects are generated from metadata objects stored, for example, in the in-memory metadata store (also referred to as an in-memory metadata layer). Data changes and updates to the metadata object are then represented by JSON strings created from the JSON objects. In some embodiments, the metadata catalog framework is used to map the JSON objects to various versions of the corresponding metadata object that exists on the different database systems. This allows for upgrading of individual database systems without affecting the implementation of logical metadata logs.

The Metadata catalog framework collects and manages information of all metadata objects in one or more database systems. In some embodiments, the information includes the structure of metadata objects, inheritance relationship of metadata objects, memory size of field and like information. From that information, in some embodiments, the metadata catalog framework calculates the size of a metadata object (equal to the total size of fields), and the position (offset) of the field. In some embodiments, metadata objects can have a predefined type of fields in the metadata catalog framework. In some embodiments, fields include pointers to other metadata objects included in the metadata catalog framework. This allows for storing parent-child or other relationships between metadata objects included in the metadata catalog framework. For example, a field of metadata object includes an array of or pointer to another metadata object.

Database Systems

FIG. 1 is a diagram 100 illustrating a database system 105 that can be used to implement aspects of the current subject matter, according to some embodiments. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
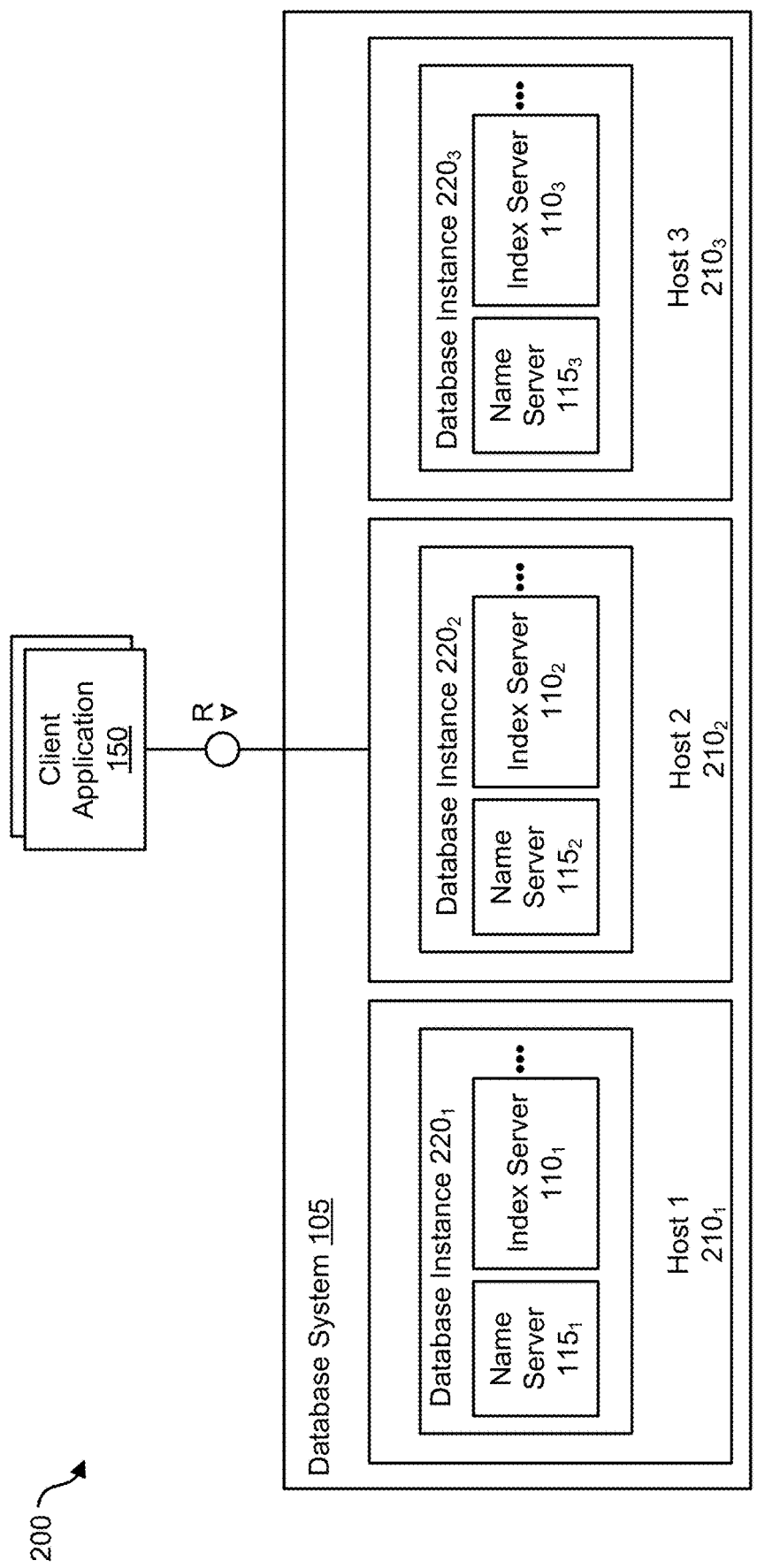
FIG. 2 is a system diagram illustrating a distributed database system having a plurality of database instances for use in connection with a metadata catalog, according to some embodiments.

FIG. 2 is a diagram 200 illustrating a variation of the database system 105 that can support distribution of server components across multiple hosts for scalability and/or availability purposes, according to some embodiments. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Index Server

Figure 3:
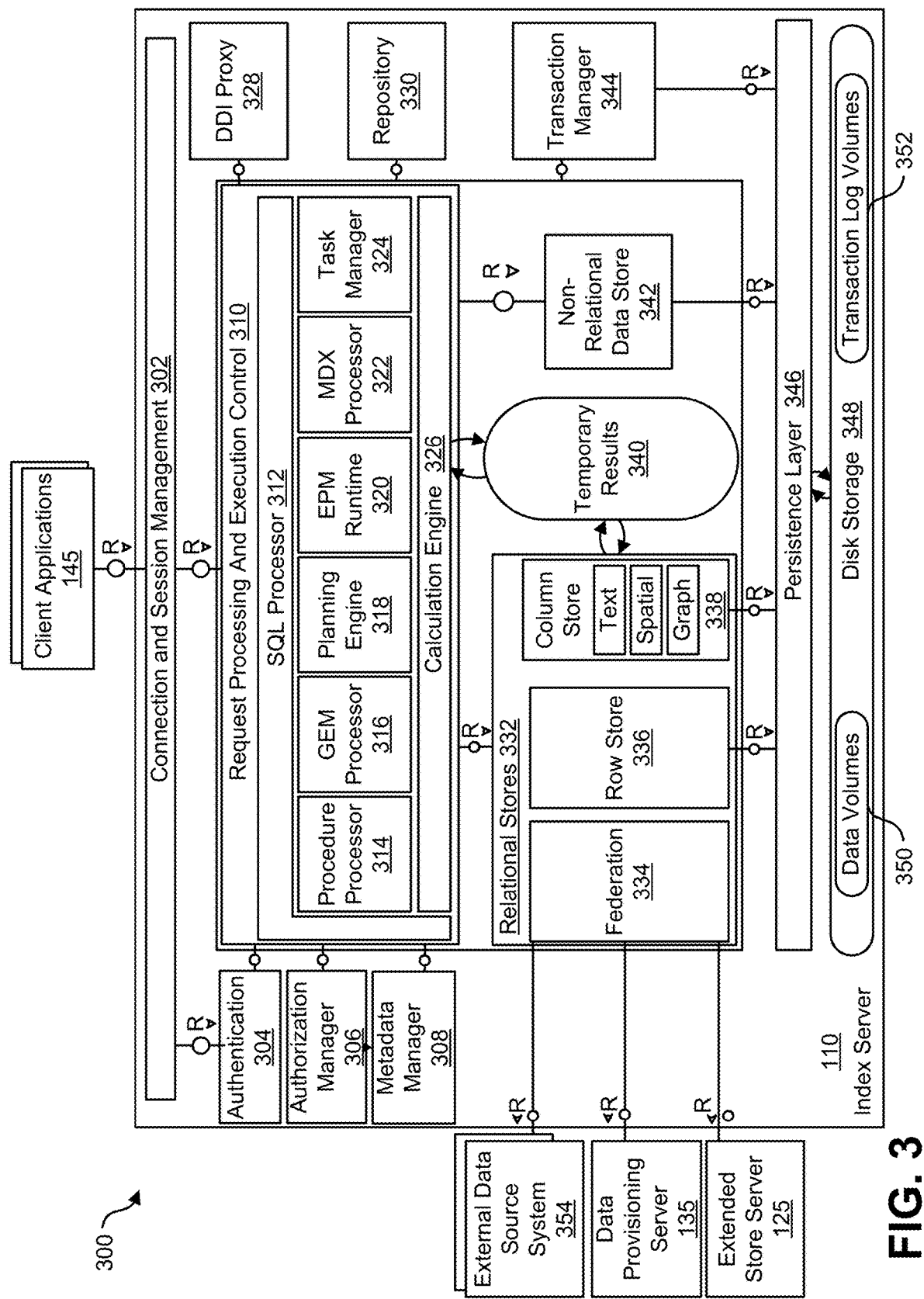
FIG. 3 is a system diagram of an index server forming part of the database system of FIG. 1, according to some embodiments.

FIG. 3 is a diagram 300 illustrating an architecture for the index server 110 (which can, as indicated above, be one of many instances) forming part of the database system of FIG. 1, according to some embodiments. A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persistent objects can be loaded via their persistent object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persistent data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Database Replication Systems

Figure 4:
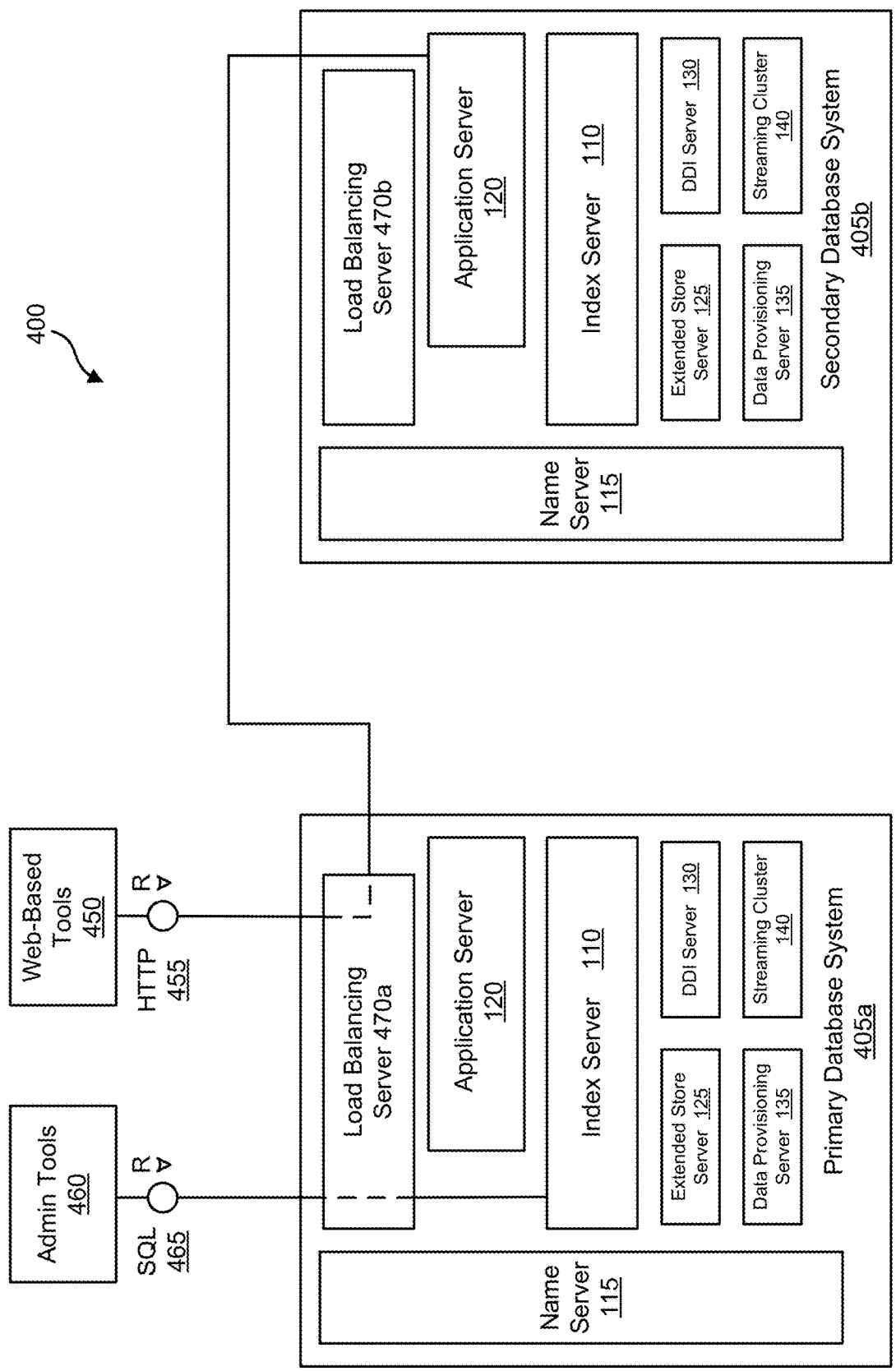
FIG. 4 is a system diagram illustrating an architecture for use in connection with a metadata catalog, which includes a primary database system and a secondary database system that serves as hot-standby to primary database system, according to some embodiments.

FIG. 4 is a system diagram illustrating an architecture 400 to support load balancing between a primary database system, or primary system 405a and a secondary database system, or secondary system 405b, which serves as hot-standby to primary system 405a, according to some embodiments. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405a, sending requests to the secondary system 405b as necessary to maintain a well distributed workload.

As depicted in FIG. 4, each of the primary system 405a and the secondary system 405b includes a load balancing server 470a and 470b which respectively receive requests from user applications directed to the primary system 405a or the secondary system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary system 405a, while routing an HTTP request 455 from web-based tools 450 to the application server 120 of the secondary system 405b.

Load balancing of resources between a primary system 405a and a secondary system 405b can give rise to a number of complicating issues. For example, if either of the requests 455, 465 requires writing to one or more data tables, or modifying a data table, then the two systems 405a, 405b will diverge. After many instances of write requests being distributed between the primary system 405a and the secondary system 405b, the two systems would be substantially different, and likely unusable. In another example, an application request, e.g. 465, may perform a write transaction that is followed by a read transaction, e.g. 455, related to the data written by the write request 465. If the write request is allocated to the primary system 405a, the read request would obtain a different result depending on whether the subsequent read transaction is carried out by the primary system 405a or by the secondary system 405b.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
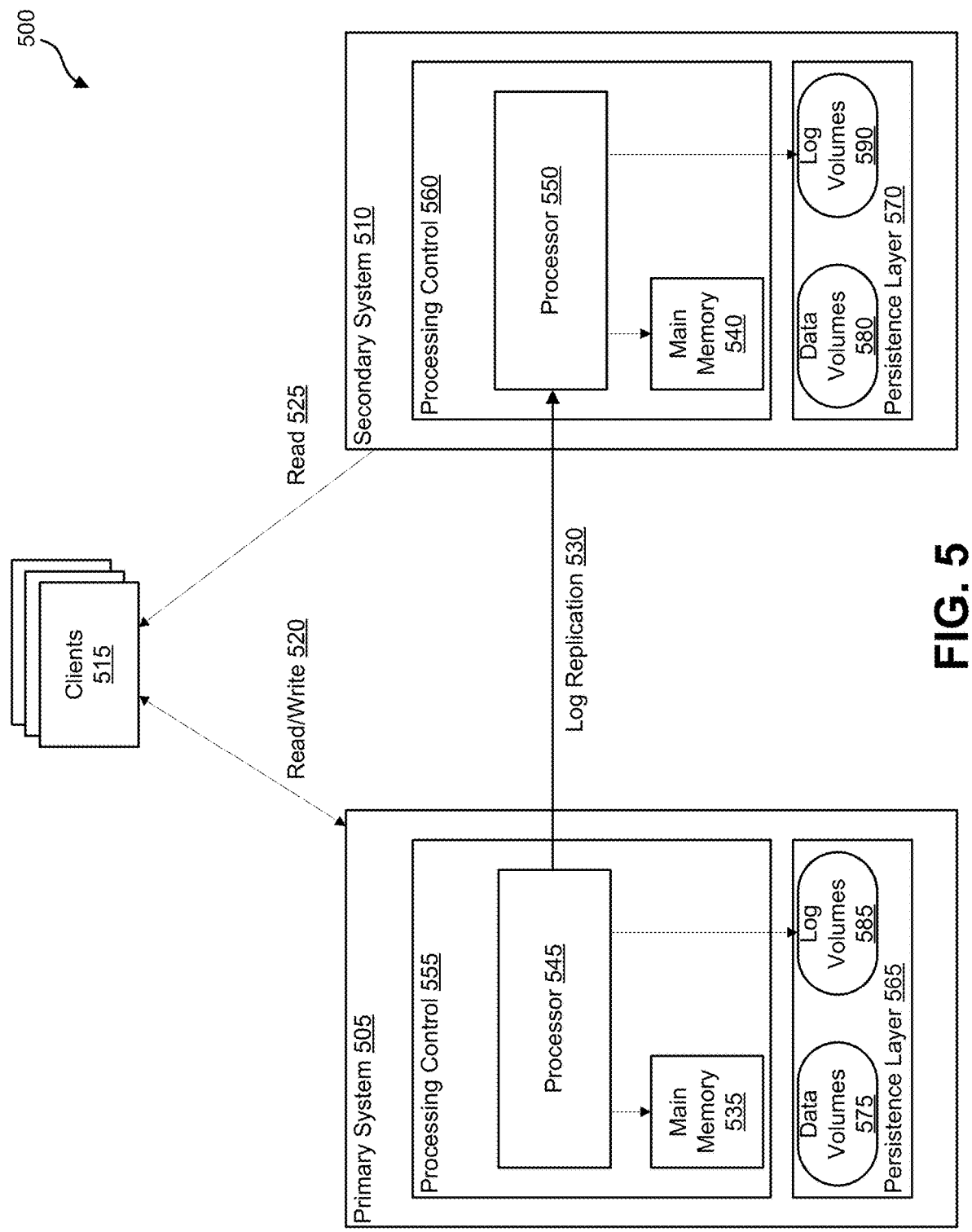
FIG. 5 is a system diagram illustrating a high-availability/disaster-recovery (HA/DR) database systems for use in connection with a metadata catalog, according to some embodiments.

FIG. 5 illustrates a HA/DR system 500 for use in connection with a metadata catalog, according to some embodiments. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary system 505 and the secondary system 525. For example, client 515 maintains a read/write connection 520 to the primary system 505 and a read only connection 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. Management of load balancing of the workload required by a client application executing at client 515 may be managed by the client 515 application itself. Alternatively, a client 515 application may submit a query request to the primary system 505. A process control 555 load balancing process executing on processor 545 then may determine where the query should be executed and replies to the client 515 with instructions identifying which system the client 515 should issue the query to.

Primary system 505 may include an in-memory database in which substantially all actively used data may be kept and maintained in main memory 535 so that operations can be executed without disk I/O, which requires accessing disk storage.

Active operations of applications within processing control 555 may cause processor 545 to read and write data into main memory 535 or to disk in the persistence layer 565. Processing control 505 applications also cause processor 545 to generate transaction logs for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery.

Primary system 505 may be the primary operational system for providing the various functionality necessary to support 24/7 operations for an organization. The time it takes after a disaster to restore full, or minimum, functionality of a data system, for example by bringing a hot-standby online, is referred to as recovery time. Secondary system 510 may be a hot-standby, ready to come online with minimal recovery time so as to minimize downtime. In an effort to minimize recovery time, and thereby downtime, in some embodiments, the secondary system in a state just short of fully operational. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

Primary system 505 and secondary system 510 differ in that all requests, from client 515 or otherwise, that require a write transaction are executed only in primary system 505. Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes one or more applications that cause processor 550 to then replay the transaction logs replicated from the primary system 505, thereby replaying the transactions at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in the transaction logs being persisted in log volumes 590.

Transaction logs may be replicated in different ways. Where maintaining a standby system in as close to the same state as the primary system is an important factor, logs may be replicated synchronously meaning that the primary system will not commit a transaction until the secondary successfully responds to the log replication. One appreciates that this will slow performance of the primary system. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

It will be appreciated from the detailed description above that such a secondary system in standby mode, such as secondary system 510, can only be as current as its most recently replayed transaction logs. Transaction logs are replicated and replayed at the secondary system 510 only after a transaction executes in the primary system 505. Secondary system 510, therefore, is always slightly behind an associated primary system 515. Also, there is no guarantee that a query routed to the primary system in a load balancing effort will be executed before, during or after a particular transaction log is replayed. Thus, the state of the primary system 505 and the state of the secondary system will rarely if ever be identical. But, by addressing certain concerns, secondary system 510 may be kept in a state substantially close to the same state as the primary system 505 such that the workload required by many operations can be supported by the secondary 510. These are just a few of the issues to be addressed in order to provide a robust load balancing implementation in a HA/DR architecture, where the hot-standby system also functions to carry a portion of the workload. One or more solutions to issues arising by the load balancing solution depicted in FIG. 5 are now addressed.

Metadata Object Replication

Figure 6:
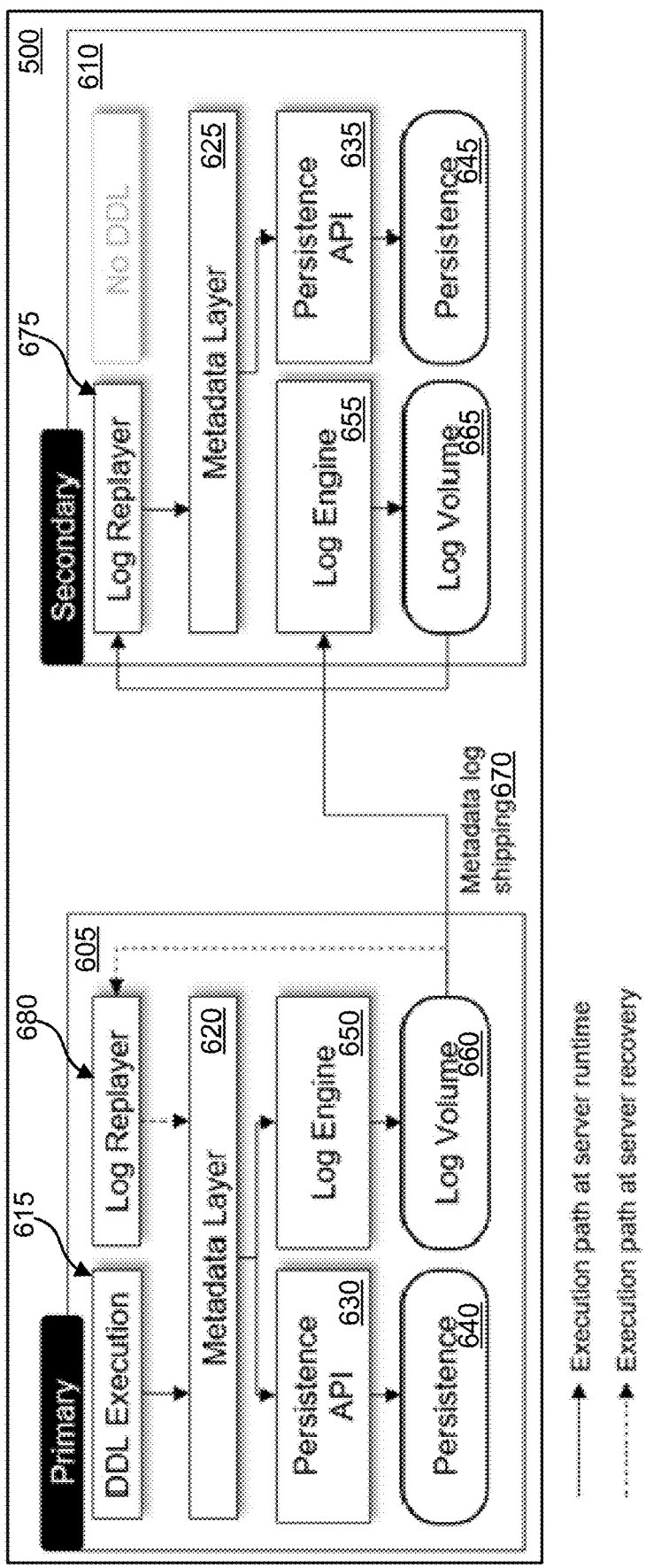
FIG. 6 is a system diagram illustrating a variation of the HA/DR system that replicates metadata object between the primary system and secondary, according to some embodiments.

FIG. 6 is a system diagram illustrating a variation of the HA/DR system 500 that replicates metadata object between the primary system 605 and secondary system 610 and is capable of load balancing between primary system 605 and secondary system 610 without interfering with the hot-standby functionality of the secondary system 610, according to some embodiments. Each of primary system 605 and secondary system 610 may be single instance database systems similar to database system 105 depicted in FIG. 1, or a distributed variation of database system 105 as depicted in FIG. 2. Furthermore, each of primary system 605 and secondary system 610 may comprise less, more or all the functionality ascribed to index server 110, 300, name server 115, application server 120, extended store server 125, DDI server 130, data provisioning server 135, and stream cluster 140.

One aspect of replicating metadata objects in the HA/DR system 500 includes writing metadata logs on the primary system 605 and subsequently replaying the metadata logs on the secondary system 610. The log types of metadata logs can be a logical log, physical log, or any similar log type. In one embodiment, the metadata logs are logical logs.

Metadata logs written by the primary systems can be transmitted to the secondary system in various modes. Transmission modes include synchronous, asynchronous, and fully synchronous, in memory and outside of memory, continuously or discrete, and similar modes. In one embodiment, the transmission includes continuously asynchronous log replay into memory and persistence structures at the secondary system 610. The transmitted metadata logs are received by the secondary system 610 and are replayed by the secondary system 610 in the order that the metadata logs were transmitted by the primary system 605.

Metadata logical logs can include JSON (JavaScript Object Notation) strings representing changes of metadata objects at the primary system. JSON is a lightweight data-interchange format that is platform-/system-independent. Metadata logical logs of JSON strings can therefore be easily replayed on other database systems. JSON is an open standard format that uses human-readable text to transmit data objects consisting of key/value pairs and that can easily parsed and generated by machines.

JSON is built on two structural elements, a collection of key/value pairs and an ordered list of values. With these characteristics, JSON can be used for representing metadata objects, especially metadata objects having a graph structure, since, for example, a collection of key/value pairs can represent member values of the metadata object and an ordered list can represent child objects or array type members of the metadata object, as described in more details in connection with FIGS. 7 and 8.

It should be appreciated that the HA/DR system 500, as illustrated in FIG. 6, is only one example of an HA/DR system, and that the HA/DR system 500 optionally has more or fewer servers or components than shown, optionally combines two or more servers or components, or optionally has a different configuration or arrangement of the servers or components. The various servers or components shown in FIG. 6 are implemented in hardware, software, or a combination of both hardware and software, including one or more signal processing and/or application specific integrated circuits. Additional details regarding an example implementation of the HA/DR server 500 are described and illustrated in connection with FIG. 5 and with architecture 400 in FIG. 4.

The primary system 605 of HA/DR system 500 can include a plurality of servers or components including, for example, a DDL execution server 615, a metadata layer 620, a persistence API server 630, a persistence store 640, a log engine, 650, a log volume 660, and a log replayer 680. Similarly, the secondary system 605 of HA/DR system 500 can include a plurality of servers or components including, for example, a metadata layer 625, a persistence API server 635, a persistence store 645, a log engine 655, a log volume 665, and a log replayer 675. In some embodiments, the secondary system 610 does not include a DDL server, since the secondary system is run in read-only mode.

At runtime of the primary system 605, the DDL (Data Definition Language) execution server 615 can execute data definition statements dispatched to the metadata manager. DDL is a standard for commands that define the different structures in a database. DDL statements create, modify, and remove database objects, including, for example, tables, indexes, and users. In some embodiments, the DDL execution server 615 is part of the metadata manager of the primary system 605. Upon execution of the data definition statements, metadata objects in the metadata layer 620 are changed based on the data definition statements. The HA/DR system 500 can use DDL to communicate the data definition statements between the servers and components of the HA/DR system 500.

The metadata layer 620, 625 is a layer in memory that includes the metadata catalog of all metadata objects of the primary system 605 and the secondary system, respectively. The metadata objects in each metadata catalog can be accessed by the persistence API server 630, 634 and log engine 650, 655 of the primary system 605 and secondary system, respectively.

Upon accessing metadata objects in the metadata layer, the persistence API server 630, 635 writes changes in persistent data to the persistent volume 640, 645 based on the changes to metadata objects in the metadata layer 620, 625. Additional details regarding an example implementation of the persistence volume as part of the persistence layer are described and illustrated in connection with the diagram 300 in FIG. 3.

Upon accessing metadata objects in the metadata layer at runtime, the log engine 650 of the primary system 605 generates a metadata log. In some embodiments, the log engine 650 generates a metadata logical log including JSON strings that represent changes to metadata objects at the primary system 605 according to a method that is described in more detail in connection with FIGS. 7 and 8. The log engine 650 stores the metadata log in the log volume 660 and transmits (ships) 670 it at runtime to the log engine 655 at the secondary system 610. Upon the primary system 605 entering a recovery mode, the metadata log is retrieved from the log volume 660 and communicated to the log replayer 680 to replay the metadata log. By replaying the metadata log the log replayer 680 regenerates the metadata catalog of all metadata objects in the metadata layer 620 of the primary system 605.

Upon receipt of replicated metadata logs from the log volume 660 of the primary system 605, the log engine 655 of the secondary system 610 stores the received metadata logs in the log volume 665, and further communicates the metadata logs to the log replayer 675. The log replayer 675 replays the metadata logs to replicate changes to the metadata objects in the metadata layer 625 based on the changes to the metadata objects in the metadata layer 620 of the primary system 605 as reflected by the log information in the metadata logs. A method for replicating a primary system by replaying metadata logs is described in more detail in connection with FIGS. 9 and 10. In some embodiments, the method is used for a read-only secondary system. In some embodiments, the replicated metadata logs are continuously replayed so that the secondary system 610 maintains a close concurrent replica of the in-memory database content of the primary system 605.

Figure 7:
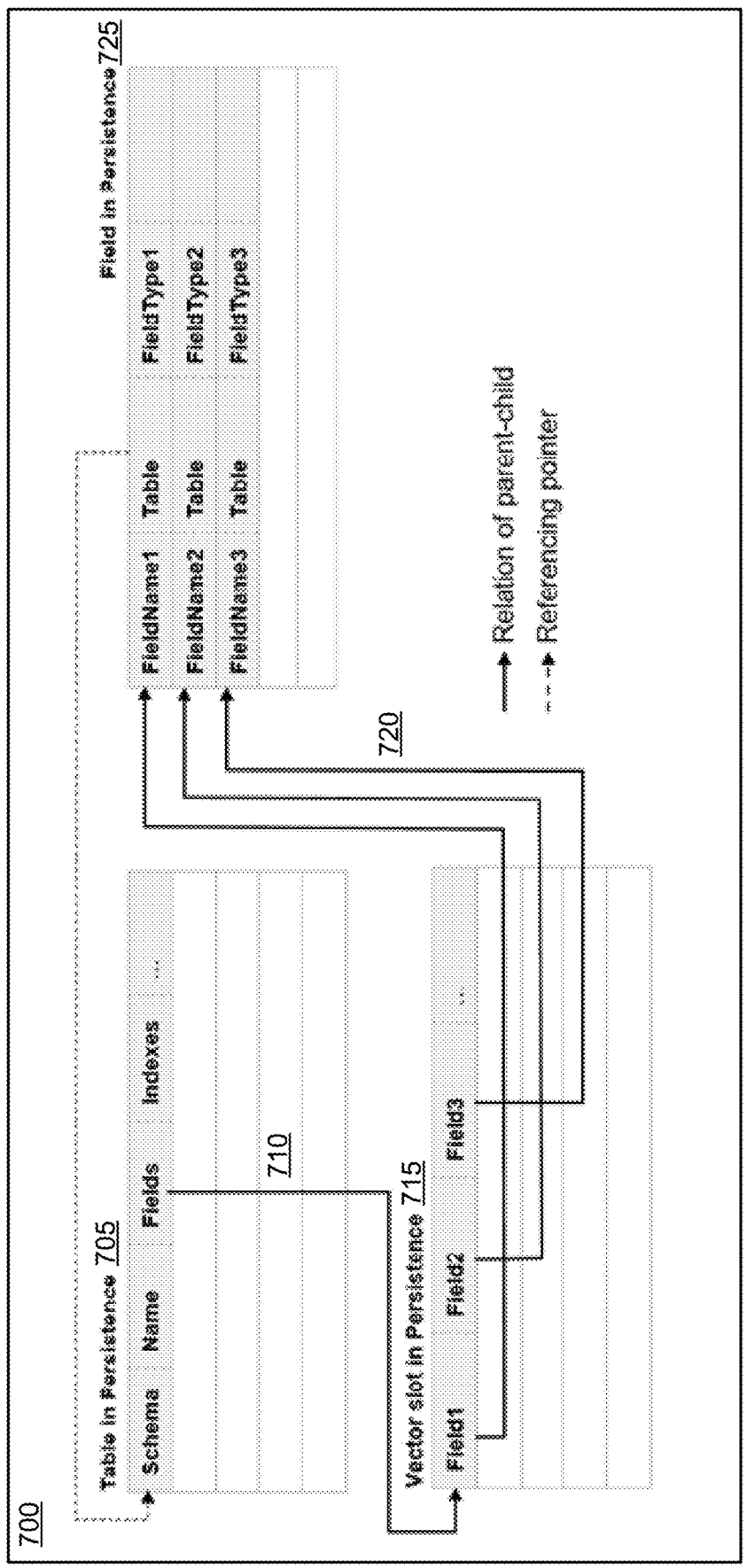
FIG. 7 illustrates a diagram of a structural metadata object for data in the persistence volume or layer with a graph structure that can be represented by JSON, according to some embodiments.

FIG. 7 illustrates a diagram 700 of a structural metadata object for data in the persistence volume or layer with a graph structure that can be represented by JSON, according to some embodiments. For the structural metadata object the relationship between the database object and its child objects can be shown graphically. In the example of FIG. 7, the database object of the structural metadata object is a relational table 705 that has fields that include pointers 710 to its child objects, for example a vector slot of fields 715, which in turn points 720 to a field object 725 that includes field names, table reference, field type and other field properties. The database object of a relational table can also include an array type as a member variable, such as integer array, string array, and pointer array, which can be easily represented in JSON. Since metadata objects are very frequently accessed from many layers or modules, metadata objects require a representation of the underlying database object that is easily transferable among components and can be easily processed to increase performance. Oftentimes, the graph structure of the underlying database object is very complex when compared to a database object of a regular table data, which has a more simple data structure. Representing the graph structure in the metadata object directly provides the parent-child relationship, which simplifies the search for a child object of the parent database object. In this case, the search does not require using information stored in parent object to identify the child object, but instead the child object can be directly identified by using the relationship provided by the graph structure.

Figure 8:
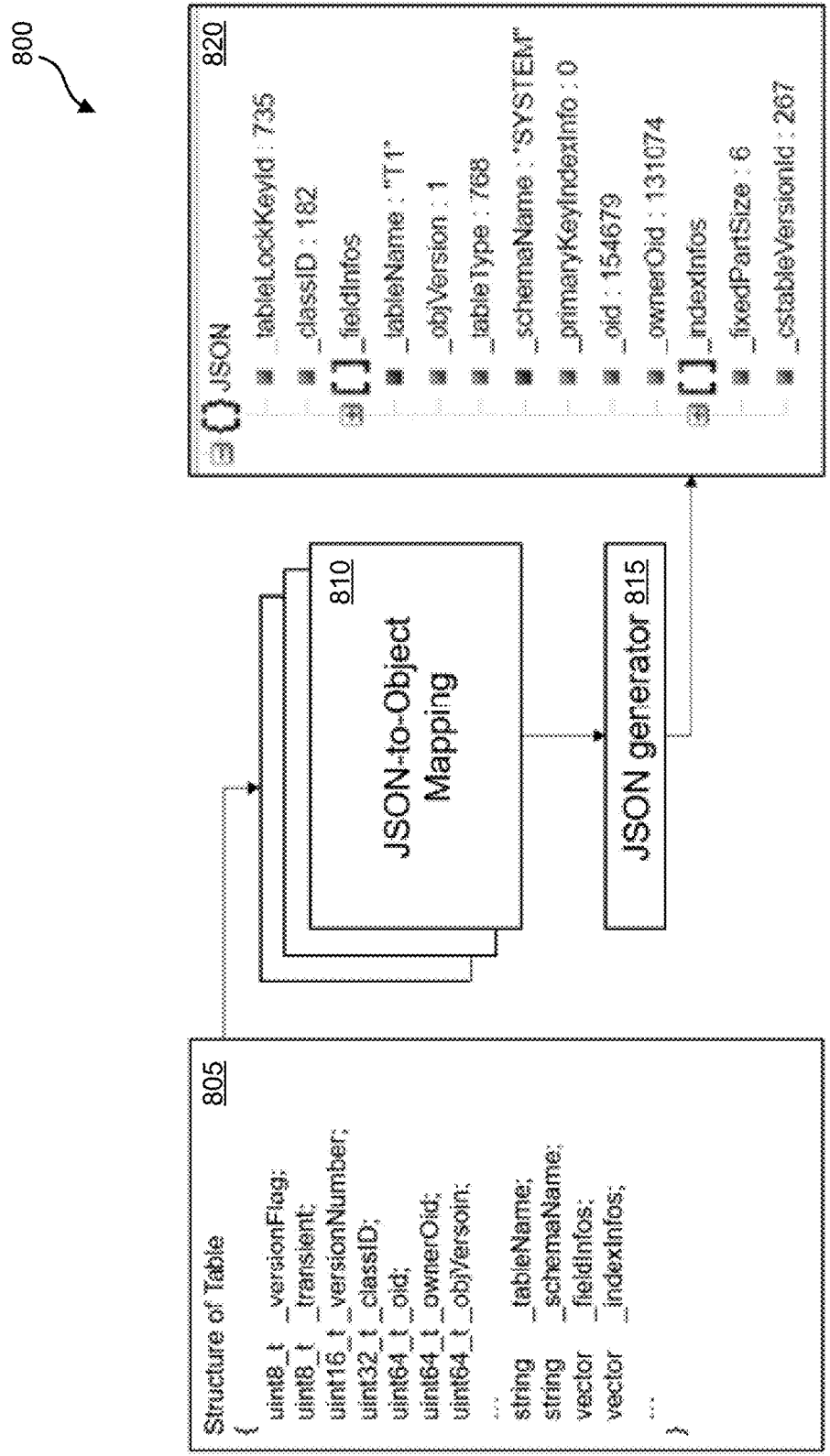
FIG. 8 is a diagram that illustrates generating a JSON object from a relational table of a database object, according to some embodiments.

FIG. 8 is a diagram 800 that illustrates generating a JSON object 820 from a relational table of a database object 805, according to some embodiments. To generate the JSON object, the JSON-to-Object mapping server 810 maps database objects to JSON objects by using a dictionary that translates entries in the database object into JavaScript code. For example, a "string" in a database object is mapped to a JavaScript string. In some embodiments, the JSON-to-Object mapping server 810 uses the version of the metadata object corresponding to the database object to provide version-independent mapping to JSON object by using a metadata catalog framework. Additional embodiments of a metadata catalog framework are further described herein. The JSON generator 815 uses the mapping provided by the JSON-to-Object mapping server 810 to generate a JSON object 820 that is human-readable and can easily represent the graph structure of a relational database object. Using JSON objects as metadata objects allows for a simple representation of changes to the metadata object in form of JSON string. For example, if the value of _tableName of the database object 805 (a string member of table structure) changed to "T1", the JSON string that has a key/value pair of "_tableName:T1" represent the corresponding change in the metadata object. This allows for a metadata log based on JSON strings to represent changes of multiple structural metadata objects. For example, the metadata log with JSON strings can represent changes to data of a relational table including its columns and indexes. This, in turn, can reduce the number of log write commands for generating the metadata log by the log engine, compared to the number of log write command required if the command is issued individually for each single change of a database object and for each database object. Using metadata log with JSON strings also eliminates any dependency between format of the metadata log and specifications of persistent storage, and provides a platform- and system-independent format to replicate and communicate the logs between systems.

FIG. 9 illustrates a flowchart 900 of a method for generating a metadata logical log in a database replication system, according to some embodiments. In some embodiments, the log engine generates 905, at the primary system of the database replication system, a metadata log for a pre-defined logging period. The log engine detects 910 a change applied to a metadata object accessible from the primary system. In response to detecting the change applied to the metadata object accessible from the primary system, the log engine generates 915 a pair of a unique metadata identifier and a metadata type for the changed metadata object. Further in response to detecting the change, the log engine determines 920 a concurrent metadata structure of the changed metadata object and generates 925 a data exchange object for the concurrent metadata structure. In some embodiments, generating the data exchange object includes mapping the concurrent metadata structure to the data exchange object. Further upon detecting the change, the log engine creates 930 a data exchange element from the data exchange object based on the change applied to metadata object and updates 935 the metadata log with log information that comprises the data exchange element and the pair of the unique identifier and the metadata type. Upon the logging period ending, the log volume transmits 940 the metadata log to a secondary system of the database recovery system for replaying the metadata log at the secondary system.

FIG. 10 illustrates a flowchart 1000 of a method for replaying a metadata log in a database recovery system, according to some embodiments. In the method, the log engine 655 receives 1010, at a secondary system of the database recovery system, a metadata log including log information that comprises at least one data exchange element and at least one pair of a unique metadata object identifier and a metadata object type, each of the at least one data exchange element string being associated with one of the at least one pair. For each log information, the log replayer 675 searches 1020 the metadata indexes for an index that corresponds to the at least one pair in the received metadata log. Responsive to determining an index that corresponds to the at least one pair, the log replayer 675 identifies 1025 a metadata object associated with the index, and the applies 1030 changes to a concurrent metadata structure of the identified metadata object, the applied changes being based on the data exchange element associated with the corresponding at least one pair.

Metadata Catalog Framework

Figure 11:
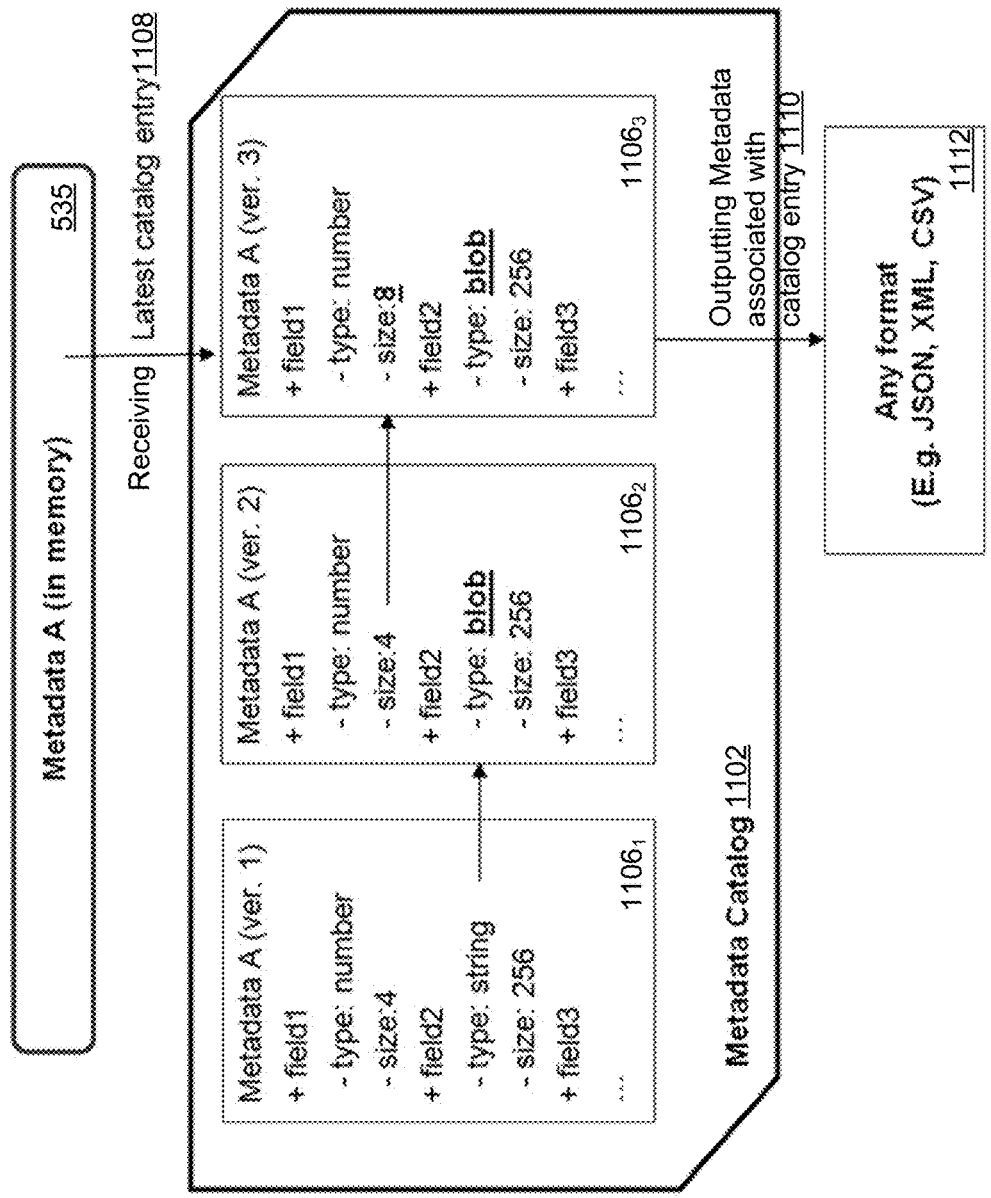
FIG. 11 is a block diagram that illustrates a metadata catalog, according to some embodiments.

FIG. 11 is a diagram illustrating a metadata catalog framework 1100, according to some embodiments. Through the metadata catalog framework, the metadata manager 308 can collect and manage various versions of metadata objects across one or more database systems in a platform- and system-independent manner. The metadata catalog 1102, as part of the framework, includes catalog entries of different versions of a metadata object $1106_{1-3}$. In some embodiments, a database system includes one or metadata catalogs 1102 with each metadata catalog including different types of metadata, such as, structural metadata, descriptive metadata, or administrative metadata. Upon receiving 1108 a metadata object from, for example, the main memory 535, the framework 1100 is capable of storing the metadata object 1106 in a platform- and system-independent form in the metadata catalog 1102.

It should be appreciated that the metadata catalog framework 1100, as illustrated in FIG. 11, is only one example of a metadata catalog framework 1100, and that the metadata catalog framework 1100 optionally has more or fewer components than shown, optionally combines two or more components, or optionally has a different configuration or arrangement of the components. The various components shown in FIG. 11 are implemented in hardware, software, or a combination of both hardware and software, including one or more signal processing and/or application specific integrated circuits. Additional details regarding an example implementation of the metadata catalog framework are described and illustrated in connection with FIG. 12 and with the metadata manager 308 in FIG. 3.

Upon receipt of metadata from other components of the primary or secondary system, the metadata manager 308 can identify the type and version of the underlying metadata object of the received metadata. In some embodiments, the metadata includes a version number and/or type identifier to allow the metadata manager 308 to identify the version and type of the corresponding metadata object. In other embodiments, the metadata manager 308 determines the version and type of metadata object from the structure of the received metadata. Information stored in the metadata catalog 1102 for a metadata object can include the structure of the metadata object, inheritance relationships of the metadata object with other metadata objects included in the metadata catalog 1102, memory size of field, and like information. In turn, the metadata manager 308 can use the stored version and structure of a metadata object to map its structure to a data exchange object.

This allows for a version-independent exchange of metadata and metadata logs between different database systems as described above. In turn, the metadata manager 308 manages the history of changes in metadata objects through the metadata catalog framework. Versions of metadata objects can be added, modified and removed from a metadata catalog by the metadata manager 308. Changes between different versions of a metadata object can be determined by the metadata manager by accessing and retrieving the versions from a metadata catalog within the framework. Version management through the metadata catalog framework also enables handling older versions of metadata objects included, for example, in backup images or metadata logs without the need to migrate system-specific implementations of these versions to newer database systems.

In a metadata catalog 1102, a structural metadata object 1106 can include a set of fields with each field including a definition of the underlying data. Each field can include a type of the data and a size of the data and can be represented as a key/value pair as further described above and in connection with FIGS. 6 and 8. Other information of a metadata object stored in the metadata catalog 1102 can include a collection of one or more definitions of relational tables, columns, rows, views, indexes, fields, procedures, pointers, vectors, arrays, schemas, graphs, dictionaries, hierarchies, types, partitions, databases, dimensions, measures, models, or a combination thereof.

The metadata manager 308 can use the metadata catalog framework 1100 to output 1110 metadata associated with the catalog entries of metadata objects 1106 in the metadata catalog 1102. By storing metadata objects in a platform- and system-independent format 1112, the metadata manager 308 is capable of outputting the metadata in various formats. For example, the metadata can be outputted in or converted to JSON (including a JSON string), XML, YAML, REBOL, Gellish, Atom, HOCON, CVS (Concurrent Versions System) and similar formats.

Different versions of a metadata object $1106_{1-3}$ can be characterized by differences in the types or sizes of fields. For example, as illustrated in FIG. 11, version "1" of the metadata object $1106_1$ of metadata "A" includes a "string" type in field "2." In version "2" of the metadata object $1106_2$, the type of field "2" changed to "blob" keeping a size of 256 bytes. In version "3" of the metadata object $1106_3$, the size of field "1" changed from four to eight byte number or integer. From the information stored in the metadata catalog 1102, metadata manager or other components of the database system can calculate the size of a metadata object (which equals the sum of the sizes of all fields in the metadata object) in memory. The position (offset) of a field can be calculated based on the sizes of all fields having higher priority in the metadata object, i.e., the fields stored first in memory. The metadata catalog framework 1100 can store the relationship among metadata objects of a metadata catalog by linking the metadata objects through pointers associated with each metadata object, which can, for example, include the memory address or offset of the linked metadata object.

In some embodiments, the metadata manager 308 determines the version and type of a metadata object received from other components of the database system by comparing the received metadata object to other metadata object included in one or more metadata catalogs 1102. The comparison can include initially comparing the number of fields in the metadata objects and, upon identifying metadata objects that have an identical number of fields, comparing their field types and sizes with each other according to their position within the metadata object. The metadata manager can derive the fields of a metadata object and their types and sizes from the structure of the underlying data of the metadata object.

Figure 12:
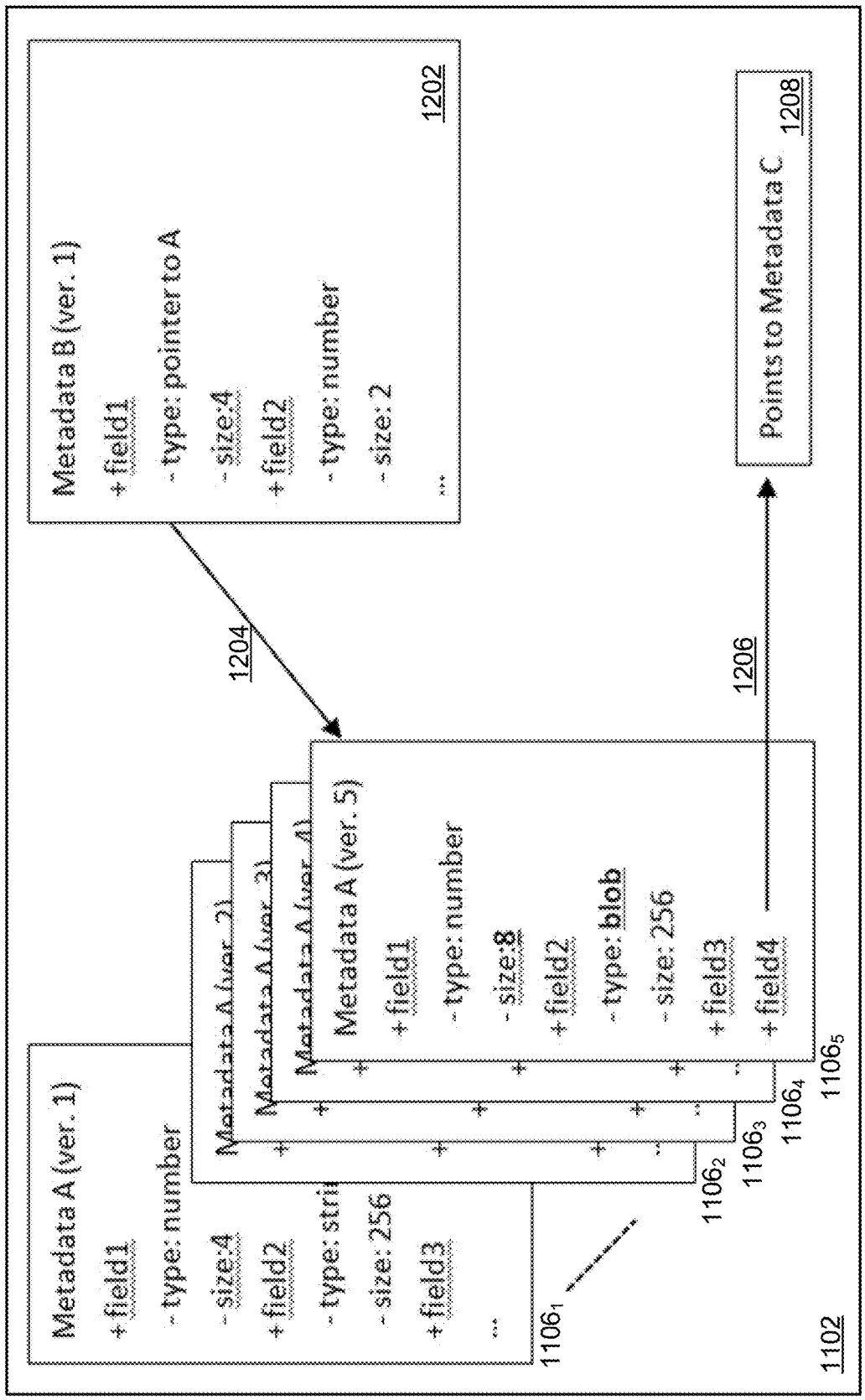
FIG. 12 is a block diagram that illustrates a metadata catalog, according to some embodiments.

FIG. 12 is a diagram illustrating another example of a metadata catalog 1102, according to some embodiments. In some embodiments, metadata objects can have a predefined type of fields in the metadata catalog framework. In the metadata catalog, fields of metadata objects can include an array of or pointer to another metadata object. For example, field "1" and "4" in the metadata object 1202, $1106_5$ include pointers 1204, 1206 to the metadata objects $1106_5$, 1208, respectively. This allows for storing parent-child or other complex relationships among metadata objects included in the metadata catalog framework. In some embodiments, links between metadata objects in a metadata catalog of the metadata catalog framework represent a graph structure of the metadata objects, with fields being nodes or vertices and the links being edges in the graph structure.

Figure 13:
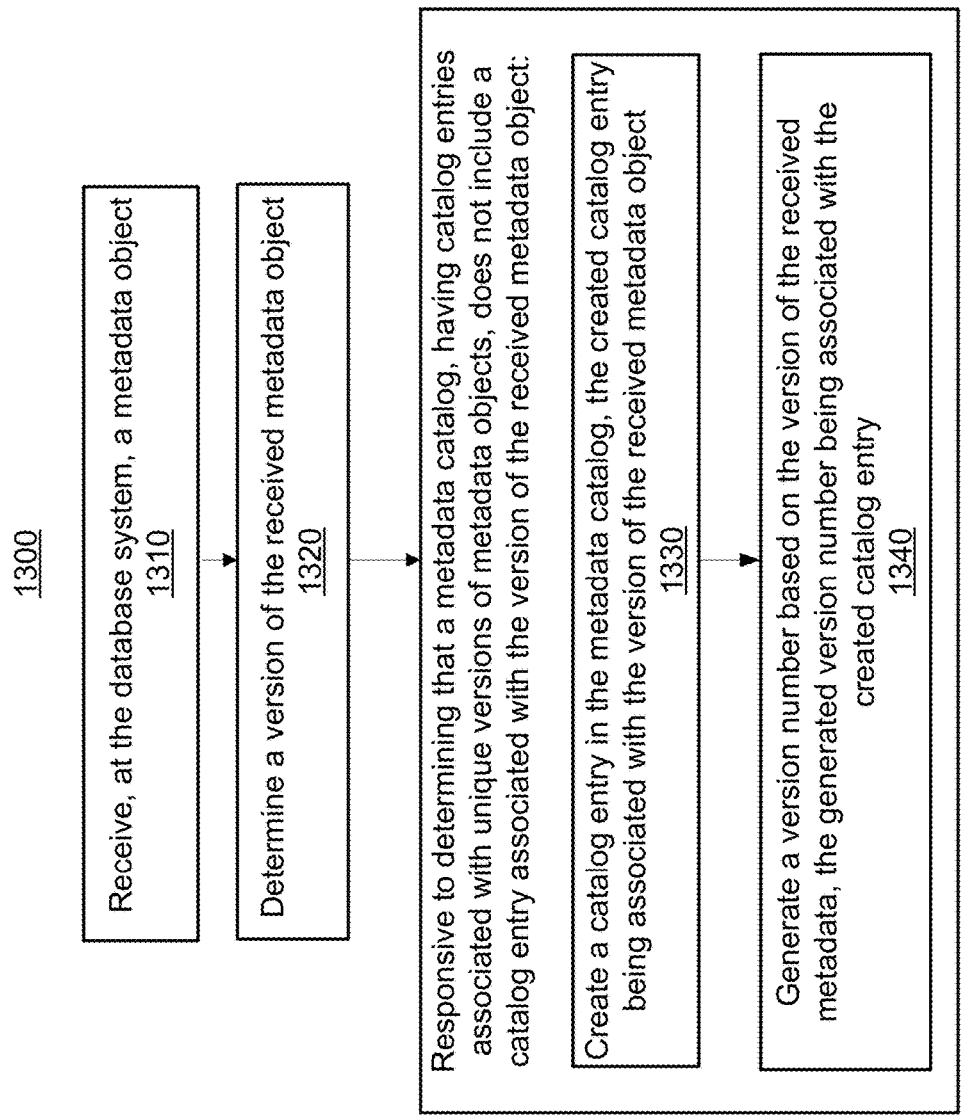
FIG. 13 is a flow diagram of a a method for generating a platform-independent metadata catalog framework of a database system, according to some embodiments.

FIG. 13 illustrates a flowchart 1300 of a method for generating a platform-independent metadata catalog framework of a database system, according to some embodiments. The metadata manager 308 receives 1310, at the database system, a metadata object and determines 1320 a version of the received metadata object. Each catalog entry is associated with a unique version of one or more metadata objects. Responsive to determining that a metadata catalog that has catalog entries associated with unique versions of metadata objects does not include a catalog entry associated with the version of the received metadata object, the metadata manager 308 creates 1330 a catalog entry in the metadata catalog. The created catalog entry is associated with the version of the received metadata object. Furthermore, responsive to determining that a metadata catalog does not include a catalog entry associated with the version of the received metadata object, the metadata manager 308 generates 1340 a version number based on the version of the received metadata object. The generated version number is associated with the created catalog entry. In some embodiments, the metadata manager 308 outputs the catalog entry associated with the version of the received metadata object. In other embodiments, the metadata manager outputs the version number associated with the created catalog entry.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for generating a metadata log in a database recovery system, the method comprising:

generating, at a primary system of the database recovery system, a metadata log for a logging period;
    detecting a plurality of changes applied to a plurality of metadata objects accessible from the primary system, wherein the plurality of metadata objects comprises multiple versions of at least one metadata object;
    in response to detecting each change applied to each metadata object accessible from the primary system:
        identifying (i) a unique metadata identifier and (ii) a metadata type for the changed metadata object, wherein the unique metadata identifier comprises a version of the metadata object based on a comparison across the multiple versions,
        associating and linking each metadata object with at least one other metadata object with a pointer based on the comparison across the multiple versions, wherein the pointer facilitates storing relationships between the plurality of metadata objects,
        determining a metadata structure of the changed metadata object,
        generating a data exchange object for the metadata structure,
        creating a data exchange element from the data exchange object based on the change applied to the metadata object, and
        updating the metadata log with log information that comprises the data exchange element, the unique identifier, and the metadata type, the unique identifier and the metadata type each being associated with the data exchange element; and
    in response to the logging period ending, transmitting a write command for the metadata log to a secondary system of the database recovery system for replaying the metadata log at the secondary system, wherein the metadata log represents the plurality of changes and comprises the pointer.

2. The method of claim 1, wherein the metadata log is a logical log.

3. The method of claim 1, wherein the data exchange object comprises a JSON object and the data exchange element comprises a JSON string.

4. The method of claim 1, wherein the metadata structure is concurrent with a snapshot of the primary system, the snapshot comprising a metadata catalog of metadata objects included in the primary systems.

5. The method of claim 4, wherein the metadata catalog is stored in memory of the primary system.

6. The method of claim 1, wherein the changed metadata object is a collection consisting of one or more definitions of relational tables, columns, rows, views, indexes, fields, procedures, pointers, vectors, arrays, schemas, graphs, dictionaries, hierarchies, types, partitions, databases, dimensions, measures, models, or a combination thereof.

7. The method of claim 1, wherein the data exchange element comprises a key and a value, the value being associated with the key and representing the change applied to the metadata object.

8. The method of claim 4, wherein the log information in the metadata log represents changes to a plurality of metadata objects included in the metadata catalog, and the relationship of at least two metadata objects of the plurality of metadata objects is capable of being represented by a graph structure.

9. The method of claim 1, wherein the log information further comprises a command that is associated with the data exchange element and represents the change applied to the metadata object.

10. The method of claim 9, wherein the command is a data definition statement, data manipulation statement, data control statement, or a combination thereof.

11. The method of claim 10, wherein the command is a data definition statement that has a syntax of a data definition language.

12. The method of claim 1, further comprising identifying a version of the changed metadata object, wherein the version is associated with the data exchange element and included in the log information.

13. The method of claim 12, wherein the generating a data exchange object for the metadata structure comprises mapping the metadata structure to the data exchange object based on the version of the changed metadata object.

14. The method of claim 1, further comprising while generating the metadata log, detecting a change applied to a metadata object accessible from the primary system.

15. A computer-implemented method for replaying a metadata log in a database recovery system, the method comprising:
receiving, at a secondary system of the database recovery system, a metadata log including log information that comprises at least one data exchange element and at least one of a unique metadata object identifier or a metadata object type, at least one JSON string being associated with one of the unique metadata object identifier or the metadata object type, wherein the metadata log comprises at least one metadata object, a pointer, and the unique metadata identifier comprises a version of the metadata object based on a comparison across multiple versions of the metadata object, wherein the pointer identifies a relationship between the at least one metadata object and the multiple versions of the metadata object based on the comparison and the pointer facilitates storing the relationship;
for each log information:
searching metadata indexes for an index that corresponds to the at least one of the unique metadata object identifier or the metadata object type in the received metadata log; and
responsive to determining an index that corresponds to the at least one of the unique metadata object identifier or the metadata object type:
identifying a metadata object associated with the index, and
applying a change to a metadata structure of the identified metadata object, the applied change being based on the at least one data exchange element associated with the at least one of the unique metadata identifier or the metadata object type.

16. The method of claim 15, wherein the metadata log is a logical log.

17. The method of claim 15, wherein the at least one data exchange element includes a JSON string.

18. The method of claim 15, further comprising generating the metadata indexes, each metadata index associated with a metadata object accessible at the secondary system, the metadata index being based on a unique metadata object identifier and a metadata type for the associated metadata object.

19. The method of claim 15, wherein the metadata structure is concurrent with a snapshot of the secondary system, the snapshot comprising a metadata catalog of metadata objects included in the secondary systems.

20. A computer-implemented database recovery system, the system comprising:
one or more data processors; and
a non-transitory computer-readable storage medium encoded with instructions for commanding the one or more data processors to perform operations comprising:
generating, at a primary system of the database recovery system, a metadata log for a logging period;
detecting a plurality of changes applied to a plurality of metadata objects accessible from the primary system, wherein the plurality of metadata objects comprises multiple versions of at least one metadata object;
in response to detecting each change applied to each metadata object accessible from the primary system:
identifying (i) a unique metadata identifier and (ii) a metadata type for the changed metadata object, wherein the unique metadata identifier comprises a version of the metadata object based on a comparison across the multiple versions,
associating and linking each metadata object with at least one other metadata object with a pointer based on the comparison across the multiple versions, wherein the pointer facilitates storing relationships between the plurality of metadata objects,
determining a metadata structure of the changed metadata object,
generating a data exchange object for the metadata structure,
creating a data exchange element from the data exchange object based on the change applied to the metadata object, and
updating the metadata log with log information that comprises the data exchange element, the unique identifier, and the metadata type, the unique identifier and the metadata type each being associated with the data exchange element; and
in response to the logging period ending, transmitting the metadata log within a single write command to a secondary system of the database recovery system for replaying the metadata log at the secondary system, wherein the metadata log represents the plurality of changes and comprises the pointer.

* * * * *